US009614253B2

(12) United States Patent
Kim et al.

(10) Patent No.: US 9,614,253 B2
(45) Date of Patent: Apr. 4, 2017

(54) ELECTROLYTE SOLUTION ADDITIVE FOR LITHIUM SECONDARY BATTERY, AND NON-AQUEOUS ELECTROLYTE SOLUTION AND LITHIUM SECONDARY BATTERY INCLUDING THE ADDITIVE

(71) Applicant: LG Chem, Ltd., Seoul (KR)

(72) Inventors: Gwang Yeon Kim, Daejeon (KR); Chul Haeng Lee, Daejeon (KR); Doo Kyung Yang, Daejeon (KR); Young Min Lim, Daejeon (KR); Shul Kee Kim, Daejeon (KR); Yu Ha An, Daejeon (KR); Jin Hyun Park, Daejeon (KR)

(73) Assignee: LG Chem, Ltd. (KR)

( * ) Notice: Subject to any disclaimer, the term of this patent is extended or adjusted under 35 U.S.C. 154(b) by 154 days.

(21) Appl. No.: 14/418,683

(22) PCT Filed: Oct. 31, 2014

(86) PCT No.: PCT/KR2014/010350
§ 371 (c)(1),
(2) Date: Jan. 30, 2015

(87) PCT Pub. No.: WO2015/065093
PCT Pub. Date: May 7, 2015

(65) Prior Publication Data
US 2016/0028115 A1 Jan. 28, 2016

(30) Foreign Application Priority Data

Oct. 31, 2013 (KR) .................. 10-2013-0131464
Oct. 30, 2014 (KR) .................. 10-2014-0149502

(51) Int. Cl.
H01M 10/0567 (2010.01)
H01M 10/0569 (2010.01)
H01M 10/0568 (2010.01)
H01M 10/052 (2010.01)

(52) U.S. Cl.
CPC ... *H01M 10/0567* (2013.01); *H01M 10/0568* (2013.01); *H01M 10/0569* (2013.01); *H01M 10/052* (2013.01); *H01M 2300/0025* (2013.01); *Y02E 60/122* (2013.01)

(58) Field of Classification Search
CPC ......... H01M 10/0567; H01M 10/0569; H01M 10/0568; H01M 10/052; H01M 2300/0025; Y02E 60/122
See application file for complete search history.

(56) References Cited

U.S. PATENT DOCUMENTS

| 2004/0106047 A1 | 6/2004 | Mie et al. |
| 2008/0206650 A1 | 8/2008 | Kim et al. |
| 2009/0017386 A1 | 1/2009 | Xu et al. |
| 2009/0226808 A1 | 9/2009 | Hiwara et al. |
| 2010/0304224 A1 | 12/2010 | Yoshimura et al. |
| 2011/0159379 A1 | 6/2011 | Matsumoto et al. |
| 2012/0009487 A1 | 1/2012 | Hwang et al. |
| 2012/0258357 A1 | 10/2012 | Kim |
| 2012/0288751 A1 | 11/2012 | Kako et al. |
| 2014/0193706 A1 | 7/2014 | Morinaka et al. |
| 2014/0377668 A1* | 12/2014 | Abe .................. H01M 10/0567 429/332 |

FOREIGN PATENT DOCUMENTS

| EP | 1962364 A1 | 8/2008 |
| EP | 2523237 A1 | 11/2012 |
| JP | 2011517042 A | 5/2011 |
| JP | 2013051122 A | 3/2013 |
| KR | 2009-0107436 A | 10/2009 |
| WO | 2010030008 A1 | 3/2010 |
| WO | WO 2013/099680 | * 7/2013 |
| WO | 2013128679 A1 | 9/2013 |

OTHER PUBLICATIONS

International Search Report from PCT/KR2014/010350, dated Feb. 9, 2015.
Supplementary European Search Report for Application No. EP14827146.3 dated Jul. 6, 2015.

* cited by examiner

*Primary Examiner* — Laura Weiner
(74) *Attorney, Agent, or Firm* — Lerner, David, Littenberg, Krumholz & Mentlik, LLP

(57) ABSTRACT

Provided is a non-aqueous electrolyte solution including a non-aqueous organic solvent, an imide-based lithium salt, and at least one additive selected from the group consisting of lithium difluoro bis(oxalato)phosphate (LiDFOP), (trimethylsilyl)propyl phosphate (TMSPa), 1,3-propene sultone (PRS), and ethylene sulfate (ESa), as an electrolyte solution additive.

According to the electrolyte solution additive for a lithium secondary battery of the present invention, the electrolyte solution additive may improve output characteristics at high and low temperatures and may prevent a swelling phenomenon by suppressing the decomposition of $PF_6^-$ on the surface of a cathode, which may occur during a high-temperature cycle of a lithium secondary battery including the electrolyte solution additive, and preventing an oxidation reaction of an electrolyte solution.

10 Claims, 2 Drawing Sheets

ELECTROLYTE SOLUTION ADDITIVE FOR LITHIUM SECONDARY BATTERY, AND NON-AQUEOUS ELECTROLYTE SOLUTION AND LITHIUM SECONDARY BATTERY INCLUDING THE ADDITIVE

CROSS-REFERENCE TO RELATED APPLICATION

This application is a national phase entry under 35 U.S.C. §371 of International Application No. PCT/KR2014/010350, filed Oct. 31, 2014, which claims priority to Korean Patent Application No. 10-2013-0131464, filed Oct. 31, 2013 and Korean Patent Application No. 10-2014-0149502, filed Oct. 30, 2014, the disclosures of which are incorporated herein by reference.

TECHNICAL FIELD

The present invention relates to an electrolyte solution additive including four kinds of compounds, a non-aqueous electrolyte solution including the electrolyte solution additive, and a lithium secondary battery including the non-aqueous electrolyte solution.

BACKGROUND ART

Demand for secondary batteries as an energy source has been significantly increased as technology development and demand with respect to mobile devices have increased. Among these secondary batteries, lithium secondary batteries having high energy density and high voltage have been commercialized and widely used.

A lithium metal oxide is used as a cathode active material of a lithium secondary battery, and lithium metal, a lithium alloy, crystalline or amorphous carbon, or a carbon composite is used as an anode active material. A current collector may be coated with the active material of appropriate thickness and length or the active material itself may be coated in the form of a film, and the resultant product is then wound or stacked with an insulating separator to prepare an electrode group. Thereafter, the electrode group is put into a can or a container similar thereto, and a secondary battery is then prepared by injecting an electrolyte solution.

Charge and discharge of the lithium secondary battery is performed while a process of intercalating and deintercalating lithium ions from a lithium metal oxide cathode into and out of a graphite anode is repeated. In this case, since lithium is highly reactive, lithium reacts with the carbon electrode to form $Li_2CO_3$, $LiO$, or $LiOH$. Thus, a film may be formed on the surface of the anode. The film is denoted as "solid electrolyte interface (SEI)".

The SEI formed at an initial stage of charging may prevent a reaction of the lithium ions with the carbon anode or other materials during the charge and discharge. Also, the SEI may only pass the lithium ions by acting as an ion tunnel. The ion tunnel may prevent the destruction of a structure of the carbon anode due to the co-intercalation of the carbon anode and organic solvents of an electrolyte solution having a high molecular weight which solvates lithium ions and moves therewith.

Therefore, in order to improve high-temperature cycle characteristics and low-temperature output of the lithium secondary battery, a robust SEI must be formed on the anode of the lithium secondary battery. When the SEI is once formed during the first charge, the SEI may prevent the reaction of the lithium ions with the anode or other materials during repeated charge and discharge cycles caused by the subsequent use of the battery, and may act as an ion tunnel that only passes the lithium ions between the electrolyte solution and the anode.

Typically, with respect to an electrolyte solution which does not include an electrolyte solution additive or includes an electrolyte solution additive having poor characteristics, the improvement of low-temperature output characteristics may not be expected due to the formation of non-uniform SEI. In addition, even in the case in which the electrolyte solution additive is included, the robust SEI may not be formed on the anode when the input thereof is not adjusted to a required amount. Thus, a swelling phenomenon, in which the anode is swollen by reacting with an electrolyte solution, may occur as a side reaction, or gas generation may be increased due to the decomposition of the electrolyte solution, and charge and discharge rate may be decreased.

DISCLOSURE OF THE INVENTION

Technical Problem

The present invention is provided to solve technical problems of the related art.

The inventors of the present application recognized that output characteristics are improved in a case where an electrolyte solution for a lithium secondary battery includes four kinds of additives, thereby leading to the completion of the present invention.

Technical Solution

According to an aspect of the present invention, there is provided a non-aqueous electrolyte solution including a non-aqueous organic solvent; an imide-based lithium salt; and at least one additive selected from the group consisting of lithium difluoro bis(oxalato)phosphate (LiDFOP), (trimethylsilyl)propyl phosphate (TMSPa), 1,3-propene sultone (PRS), and ethylene sulfate (ESa), as an electrolyte solution additive.

The imide-based lithium salt may be $Li(SO_2F)_2N$ (lithium bis(fluorosulfonyl)imide, LiFSI), the non-aqueous organic solvent may include dimethyl carbonate (DMC), ethylmethyl carbonate (EMC), ethylene carbonate (EC), and propylene carbonate (PC), and the additive may include lithium difluoro bis(oxalato)phosphate (LiDFOP), (trimethylsilyl) propyl phosphate (TMSPa), 1,3-propene sultone (PRS), and ethylene sulfate (ESa). Also, the lithium salt may further include $LiPF_6$.

According to another aspect of the present invention, there is provided a lithium secondary battery including: a cathode; an anode; and the non-aqueous electrolyte solution.

Advantageous Effects

According to an electrolyte solution additive for a lithium secondary battery of the present invention, the electrolyte solution additive may improve output characteristics at high and low temperatures and may prevent a swelling phenomenon by suppressing the decomposition of $PF_6^-$ on the surface of a cathode, which may occur during a high-temperature cycle of a lithium secondary battery including the electrolyte solution additive, and preventing an oxidation reaction of an electrolyte solution.

MODE FOR CARRYING OUT THE INVENTION

Figure 1:
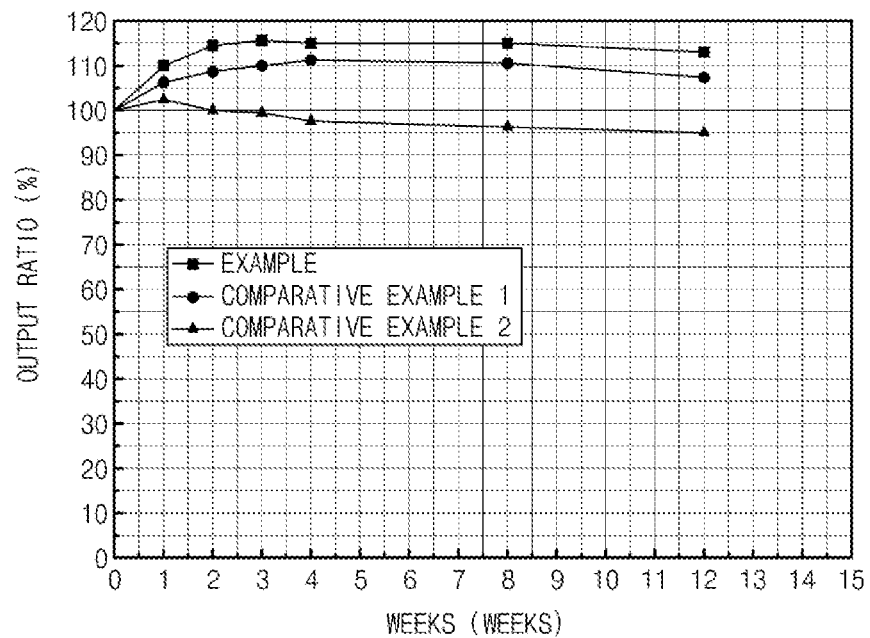
FIG. 1 is a graph illustrating output characteristics after high-temperature storage of Example 1 and Comparative Examples 1 and 2.

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

An embodiment of the present invention provides a non-aqueous electrolyte solution including a non-aqueous organic solvent, an imide-based lithium salt, and at least one additive selected from the group consisting of lithium difluoro bis(oxalato)phosphate (LiDFOP), (trimethylsilyl)propyl phosphate (TMSPa), 1,3-propene sultone (PRS), and ethylene sulfate (ESa), as an electrolyte solution additive.

The imide-based lithium salt may be at least one selected from the group consisting of $LiN(CF_3SO_2)_2$, $LiN(C_2F_5SO_2)_2$, $Li(CF_3SO_2)(C_2F_5SO_2)N$, and $Li(SO_2F)_2N$, and according to an embodiment of the present invention, the imide-based lithium salt may be $Li(SO_2F)_2N$ (lithium bis(fluorosulfonyl)imide, LiFSI).

The lithium salt, which may be included in the non-aqueous electrolyte solution according to the embodiment of the present invention, may further include $LiPF_6$.

Since the LiFSI and $LiPF_6$ are combined, the reduction of the output of a battery due to low mobility of lithium ions caused by high viscosity of $LiPF_6$ at low temperature may be improved by adding LiFSI that may maintain low viscosity even at low temperature.

The LiFSI and $LiPF_6$ may be mixed in a molar ratio of LiFSI to $LiPF_6$ of 10:90 to 50:50. In the case that a trace amount of $LiPF_6$ is included within the above range, capacity of the formed battery may be low. In the case in which an excessive amount of $LiPF_6$ is included, the viscosity at low temperature increases to decrease the mobility of lithium ions. Thus, the output of the formed battery may not be improved.

The additive may include at least one selected from the group consisting of lithium difluoro bis(oxalato)phosphate (LiDFOP), (trimethylsilyl)propyl phosphate (TMSPa), 1,3-propene sultone (PRS), and ethylene sulfate (ESa). However, according to an embodiment of the present invention, the additive may include four kinds including lithium difluoro bis(oxalato)phosphate (LiDFOP), (trimethylsilyl)propyl phosphate (TMSPa), 1,3-propene sultone (PRS), and ethylene sulfate (ESa).

In the case that the lithium salt is $LiPF_6$, the electrolyte solution having insufficient thermal stability may be easily decomposed in the battery to form LiF and $PF_5$. In this case, the LiF salt may reduce conductivity and the number of free $Li^+$ ions to increase the resistance of the battery, and as a result, the capacity of the battery is reduced. That is, in the decomposition of $PF_6^-$ ions on the surface of a cathode which may occur during a high-temperature cycle, a phosphate functional group of the (trimethylsilyl)propyl phosphate or a sulfate functional group of the ethylene sulfate (ESa) acts as an anion receptor to induce the stable formation of $PF_6^-$ and increase the separation of ion pairs of $Li^+$ and $PF_6^-$. As a result, interfacial resistance may be reduced by improving the solubility of LiF in the electrolyte solution.

Also, the LiDFOP additive may form a stable solid electrolyte interface (SEI) on a surface of an anode after a battery activation process to suppress gas which is generated due to the decomposition of the electrolyte solution caused by the reaction between the surface of the anode and the electrolyte solution in the battery. Thus, the LiDFOP additive may improve life characteristics of the lithium secondary battery.

Herein, the lithium difluoro bis(oxalato)phosphate (LiDFOP), 1,3-propene sultone (PRS), and ethylene sulfate (ESa) additives may each independently be included in an amount of 0.5 wt % to 1.5 wt %, for example, 0.5 wt % to 1.0 wt %, based on a total amount of the electrolyte solution. In the case that each amount of the lithium difluoro bis(oxalato)phosphate (LiDFOP), 1,3-propene sultone (PRS), and ethylene sulfate (ESa) additives is less than 0.5 wt %, the effect of suppressing the decomposition as an anion receptor in a high-temperature cycle may be insignificant. With respect to the LiDFOP additive, the formation of the stable SEI on the surface of the anode may not be achieved, and the PRS additive may not effectively suppress the gas generated from the electrolyte solution. In the case in which each amount of the additives is greater than 1.5 wt %, lithium ion permeability of the protective layer may be reduced to increase impedance, and sufficient capacity and charge and discharge efficiency may not be obtained. Also, the (trimethylsilyl) propyl phosphate (TMSPa) additive may be included in an amount of 0.1 wt % to 0.5 wt % based on the total amount of the electrolyte solution. In the case that the amount of the (trimethylsilyl)propyl phosphate (TMSPa) additive is less than 0.1 wt %, since the amount is excessive small, the decomposition of $LiPF_6$ may not be suppressed. In the case in which the amount of the TMSPa additive is greater than 0.5 wt %, the lithium ion permeability may be reduced to increase impedance, and sufficient capacity and charge and discharge efficiency may not be obtained.

The non-aqueous electrolyte solution according to the embodiment of the present invention may include the electrolyte solution additive, non-aqueous organic solvent, and lithium salt.

Also, the non-aqueous organic solvent, which may be included in the non-aqueous electrolyte solution, is not limited as long as it may minimize the decomposition due to the oxidation reaction during the charge and discharge of the battery and may exhibit desired characteristics with the additive. For example, the non-aqueous organic solvent may include carbonate-based compounds and propionate-based compounds. These compounds may be used alone or in combination of two or more thereof.

Among the above non-aqueous organic solvents, the carbonate-based organic solvents may include any one selected from the group consisting of dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), and butylene carbonate (BC), or a mixture of two or more thereof. Examples of the propionate-based compounds may include any one selected from the group consisting of ethyl propionate (EP), propyl propionate (PP), n-propyl propionate, isopropyl propionate, n-butyl propionate, isobutyl propionate, and tert-butyl propionate, or a mixture of two or more thereof.

According to an embodiment of the present invention, the carbonate-based solvents may be used in combination thereof. For example, an electrolyte solution including dimethyl carbonate (DMC), ethylmethyl carbonate (EMC), ethylene carbonate (EC), and propylene carbonate (PC) may be used as the non-aqueous organic solvent.

As the 4 kinds of the electrolyte solutions, EC/PC/EMC/DMC may be respectively included in an amount of 1.0 part by weight to 1.5 parts by weight: 1.0 part by weight to 1.5 parts by weight: 4.0 parts by weight to 4.5 parts by weight: and 4.0 parts by weight to 4.5 parts by weight. According to an embodiment of the present invention, the ratio of EC/PC/EMC/DMC expressed as parts by weight may be about 1:1:4:4.

In the case that the carbonate compounds are combined within the above weight ratio and used as the non-aqueous organic solvent, dimethyl carbonate (DMC) may particularly improve the output of the lithium battery, but gas may be generated during the high-temperature cycle of the secondary battery. Thus, 1,3-propene sultone (PRS) among the additives may improve the life characteristics of the secondary battery by effectively suppressing the gas generated from the DMC.

A lithium secondary battery according to an embodiment of the present invention may include a cathode, an anode, a separator disposed between the cathode and the anode, and the non-aqueous electrolyte solution. The cathode and the anode may include a cathode active material and an anode active material, respectively.

Herein, the cathode active material may include a manganese-based spinel active material, lithium metal oxide, or a mixture thereof. Furthermore, the lithium metal oxide may be selected from the group consisting of lithium-cobalt-based oxide, lithium-manganese-based oxide, lithium-nickel-manganese-based oxide, lithium-manganese-cobalt-based oxide, and lithium-nickel-manganese-cobalt-based oxide, and for example, may include $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, and $a+b+c=1$), $LiNi_{1-y}Co_yO_2$, $LiCo_{1-y}Mn_yO_2$, $LiNi_{1-y}Mn_yO_2$ (where), $0 \leq Y<1$), $Li(Ni_aCo_bMn_c)O_4$ (where $0<a<2$, $0<b<2$, $0<c<2$, and $a+b+c=2$), $LiMn_{2-z}Ni_zO_4$, and $LiMn_{2-z}Co_zO_4$ (where $0<z<2$).

As the anode active material, a carbon-based anode active material, such as crystalline carbon, amorphous carbon, and a carbon composite, or a graphite-based anode active material, such as natural graphite and artificial graphite, may be used alone or in a mixture of two or more thereof.

Also, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination of two or more thereof as the separator. In addition, a typical porous nonwoven fabric, for example, a nonwoven fabric formed of high melting point glass fibers or polyethylene terephthalate fibers may be used. However, the separator is not limited thereto.

The lithium secondary battery may be prepared by a typical method related to the present invention, and the lithium secondary battery may be a pouch type secondary battery.

EXAMPLES

Hereinafter, the present invention will be described in more detail, according to examples and experimental examples. However, the present invention is not limited thereto.

Example 1

Preparation of Electrolyte Solution

A mixed non-aqueous organic solvent having a composition, in which a ratio of ethylene carbonate (EC):propyl carbonate (PC):ethylmethyl carbonate (EMC):dimethyl carbonate (DMC) was 1.32:1.20:4.08:4.28 (parts by weight), 0.5 M $LiPF_6$, and 0.5 M LiFSI were mixed, and a non-aqueous electrolyte solution was then prepared by adding 1 wt % of lithium difluoro bis(oxalato)phosphate (LiDFOP), 0.2 wt % of (trimethylsilyl)propyl phosphate (TMSPa), 1 wt % of 1,3-propene sultone (PRS), and 1 wt % of ethylene sulfate (ESa) based on 100 parts by weight of the non-aqueous electrolyte solution thereto.

Preparation of Lithium Secondary Battery

A cathode mixture slurry was prepared by adding 92 wt % of $LiCoO_2$ as a cathode active material, 4 wt % of carbon black as a conductive agent, and 4 wt % of polyvinylidene fluoride (PVdF) as a binder to N-methyl-2-pyrrolidone (NMP) as a solvent. An about 20 µm thick aluminum (Al) thin film as a cathode current collector was coated with the cathode mixture slurry and dried, and the Al thin film was then roll-pressed to prepare a cathode.

Also, an anode mixture slurry was prepared by adding 96 wt % of artificial graphite as an anode active material, 3 wt % of PVdF as a binder, and 1 wt % of carbon black as a conductive agent to NMP as a solvent. A 10 µm thick copper (Cu) thin film as an anode current collector was coated with the anode mixture slurry and dried, and the Cu thin film was then roll-pressed to prepare an anode.

A polymer type battery was prepared by a typical method using a separator formed of three layers of polypropylene/polyethylene/polypropylene (PP/PE/PP) with the cathode and anode thus prepared, and a secondary battery was then completed by injecting the prepared non-aqueous electrolyte solution.

Comparative Example 1

A lithium secondary battery was prepared in the same manner as in Example 1 except that 1.0M $LiPF_6$ was only used as the lithium salt.

Comparative Example 2

A lithium secondary battery was prepared in the same manner as in Example 1 except that 3 wt % of vinylene carbonate (VC), 0.5 wt % of 1,3-propene sultone (PS), and 1 wt % of ethylene sulfate (ESa) were added as the additives based on the total weight of the non-aqueous electrolyte solution.

Experimental Examples

Output Characteristics after High-Temperature Storage

While storing the secondary batteries prepared in Example 1 and Comparative Examples 1 and 2 at 60° C. for a maximum of 12 weeks, outputs were calculated from voltage differences which were obtained by respectively charging and discharging the secondary batteries at week 1, week 2, week 3, week 4, week 8, and week 12 at 5 C for 10 seconds at 23° C. The output capacity after high-temperature storage of the secondary battery corresponding to each storage period was calculated as a percentage based on initial output capacity (W, week 0) (output (W) of the corresponding week/initial output (W) 100(%)), and the results thereof are presented in FIG. 1. The experiment was performed at a state of charge (SOC) of 50%.

As illustrated in FIG. 1, it may be understood that the secondary battery of Example 1 had excellent output characteristics even after high-temperature storage at 60° C. In particular, since 4 kinds of the additives of the present invention were not used in the secondary battery of Comparative Example 2, it may be understood that output characteristics of the secondary battery of Comparative Example 2 after the high-temperature storage at 60° C. was lower (95%) than the initial value.

Battery Thickness Measurement

While storing the secondary batteries prepared in Example 1 and Comparative Examples 1 and 2 at 60° C. for a maximum of 12 weeks, thickness increase rates (%) of the secondary batteries based on an initial thickness (week 0) of the battery were measured at week 1, week 2, week 3, week 4, week 8, and week 12. The results thereof are presented in FIG. 2 below.

Figure 2:
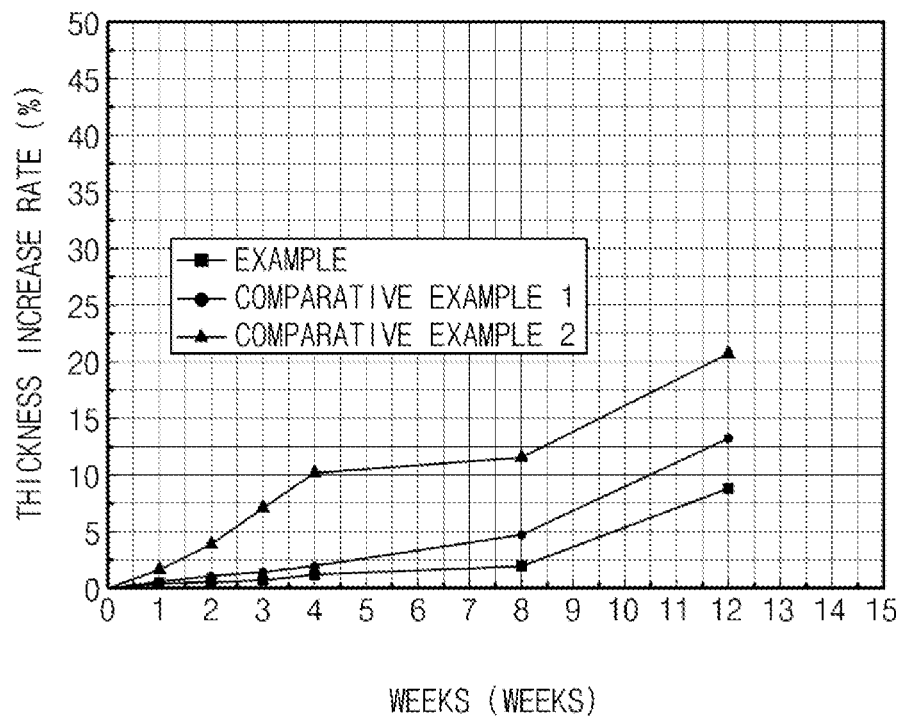
FIG. 2 is a graph illustrating thickness changes after high-temperature storage of Example 1 and Comparative Examples 1 and 2.

As illustrated in FIG. 2, it may be understood that the thickness increase rate of the secondary battery of Example 1 after the high-temperature storage was the lowest (20% at week 12). In particular, it may be understood that the secondary battery of Comparative Example 2 exhibited the rapid thickness increase rate from the beginning of the high-temperature storage. Since the thickness increase rate of the secondary battery of Comparative Example 1 was also increased after 4 weeks, it may be confirmed that the secondary battery of Comparative Example 1 was less efficient than the secondary battery of Example 1 according to the embodiment of the present invention.

Low-Temperature Output Characteristics

Outputs were calculated from voltage differences which were obtained by charging and discharging the secondary batteries prepared in Example 1 and Comparative Examples 1 and 2 at 0.5 C for 10 seconds at −30° C. The results thereof are presented in FIG. 3. The experiment was performed at a SOC of 50%.

Figure 3:
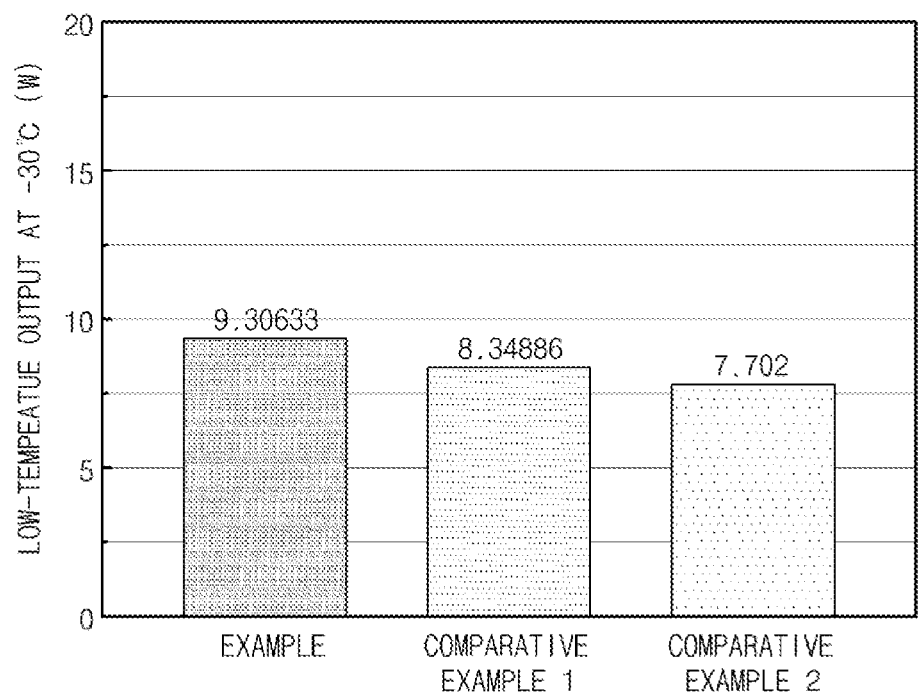
FIG. 3 is a graph illustrating low-temperature output characteristics of Example 1 and Comparative Examples 1 and 2.

As illustrated in FIG. 3, it may be understood that the secondary battery of Example 1 exhibited low-temperature output which was a maximum of 1.5 W greater than those of the secondary batteries of Comparative Examples 1 and 2.

The invention claimed is:

1. A non-aqueous electrolyte solution comprising:
a non-aqueous organic solvent;
an imide-based lithium salt; and
lithium difluoro bis(oxalato)phosphate (LiDFOP), (trimethylsilyl)propyl phosphate (TMSPa), 1,3-propene sultone (PRS), and ethylene sulfate (ESa), as electrolyte solution additives,
wherein the imide-based lithium salt is $Li(SO_2F)_2N$ (lithium bis(fluorosulfonyl)imide, LiFSI) and,
wherein the non-aqueous organic solvent comprises at least one selected from the group consisting of dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), and butylene carbonate (BC).

2. The non-aqueous electrolyte solution of claim 1, wherein the non-aqueous organic solvent comprises ethylene carbonate (EC), propylene carbonate (PC), ethylmethyl carbonate (EMC), and dimethyl carbonate (DMC).

3. The non-aqueous electrolyte solution of claim 2, wherein the non-aqueous organic solvent comprises ethylene carbonate (EC)/propylene carbonate (PC)/ethylmethyl carbonate (EMC)/dimethyl carbonate (DMC) respectively in an amount of 1.0 part by weight to 1.5 parts by weight: 1.0 part by weight to 1.5 parts by weight: 4.0 parts by weight to 4.5 parts by weight: and 4.0 parts by weight to 4.5 parts by weight.

4. The non-aqueous electrolyte solution of claim 1, wherein the lithium difluoro bis(oxalato)phosphate (LiDFOP), the 1,3-propene sultone (PRS), and the ethylene sulfate (ESa) are each independently included in an amount of 0.5 wt % to 1.5 wt % based on a total amount of the electrolyte solution, and the (trimethylsilyl)propyl phosphate (TMSPa) is included in an amount of 0.1 wt % to 0.5 wt % based on the total amount of the electrolyte solution.

5. The non-aqueous electrolyte solution of claim 1, further comprising $LiPF_6$.

6. The non-aqueous electrolyte solution of claim 5, wherein a mixing ratio of the imide-based lithium salt to $LiPF_6$ is in a range of 10:90 to 50:50 as a molar ratio.

7. A lithium secondary battery comprising:
a cathode;
an anode;
a separator; and
the non-aqueous electrolyte solution of claim 1.

8. The lithium secondary battery of claim 7, wherein the anode comprises a carbon-based anode active material selected from the group consisting of crystalline carbon, amorphous carbon, artificial graphite, and natural graphite.

9. The lithium secondary battery of claim 7, wherein the cathode comprises a lithium metal oxide.

10. The lithium secondary battery of claim 7, wherein the lithium secondary battery is a lithium ion secondary battery or a lithium polymer secondary battery.

* * * * *